United States Patent [19]

Dreibelbis

[11] 4,183,466
[45] Jan. 15, 1980

[54] THERMALLY ACTUATED PHASE CHANGE OPERATED CONTROL VALVE FOR HEAT PUMP SYSTEMS

[75] Inventor: Richard C. Dreibelbis, Fair Lawn, N.J.

[73] Assignee: Emerson Electric Co. (H & H Precision Products), Saint Louis, Mo.

[21] Appl. No.: 811,725

[22] Filed: Jun. 30, 1977

[51] Int. Cl.² .......................................... G05D 23/12
[52] U.S. Cl. .................................. 236/1 C; 165/39; 236/100
[58] Field of Search ................. 236/1 C, 100; 165/39

[56] References Cited

U.S. PATENT DOCUMENTS

| | | | |
|---|---|---|---|
| 1,085,339 | 1/1914 | Holmes | 236/100 |
| 2,469,212 | 5/1949 | Shaw | 236/34.5 |
| 2,575,100 | 11/1951 | Duey | 236/1 C |
| 2,636,776 | 4/1953 | Vernet | 236/93 A |
| 2,957,680 | 10/1960 | Sterner | 236/1 C |
| 3,019,986 | 2/1962 | Schoerner | 236/93 A |
| 3,273,796 | 9/1966 | Bauerlein | 236/100 |
| 3,294,321 | 12/1966 | Couffer | 236/1 C |
| 3,398,891 | 8/1968 | Horne | 236/100 X |
| 3,682,380 | 8/1972 | Aziz | 236/34.5 |
| 3,738,571 | 6/1973 | Elmer | 236/100 |
| 3,907,199 | 9/1975 | Kreger | 236/34.5 |
| 3,946,943 | 3/1976 | Hattori | 236/100 X |
| 4,055,298 | 10/1977 | Wilson | 236/100 |

Primary Examiner—Leslie Braun
Attorney, Agent, or Firm—Daniel H. Bobis

[57] ABSTRACT

A thermally actuated phase change operated control valve particularly adapted for use with heat pump systems has a valve body having a bore therein defining a fluid flow chamber, said valve body having an inlet port at one end and spaced and sized outlet ports in the medial wall thereof so that a valve head slidably disposed in the fluid flow chamber will in the calibrated position of the valve head maintain a predetermined minimum flow of fluid from said inlet port through the respective outlet ports. A thermally operated phase change assembly is adjustably connected to said valve housing so that the operating member of said phase change assembly extends into said valve housing and is connected to said valve head to modulate the valve head in one direction to vary the opening to one pair of outlet ports until a maximum flow is passed therethrough at one predetermined low temperature and to modulate the valve head in the opposite direction so as to vary the opening of the other pair of outlet ports until maximum fluid flow is passed therethrough at one predetermined high temperature. Minimum flow may be maintained by providing an intentional clearance between the O.D. of the valve head and the I.D. of the fluid flow chamber in which the valve head is slidably mounted and/or by making a valve head with a length shorter than the spaced distance between the extremities of the sides of the outlet ports. The valve head length can control the length of the dead band or the position where minimum flow is maintained for a given temperature range and the valve head can also be beveled, shaped or contoured to vary the characteristics of the flow of the fluid being controlled.

10 Claims, 13 Drawing Figures

THERMALLY ACTUATED PHASE CHANGE OPERATED CONTROL VALVE FOR HEAT PUMP SYSTEMS

BACKGROUND OF THE INVENTION

This invention relates generally to valves for modulating the flow of fluid in a fluid or water circulating system and more particularly to a temperature sensitive phase change operated control valve for such circulating system which is responsive to variations in temperature of a fluid in an associated system such as the refrigerant in a heat pump system operatively associated with the fluid or water circulating system.

In many heat pump systems there will generally be an indoor refrigerant-to-air heat exchanger for the space to be conditioned and an outdoor refrigerant-to-water heat exchanger wherein the water from any suitable source operates as a heat sink for delivering heat to or receiving heat from the refrigerant circulating in non-contacting heat exchange relation with the water in the outdoor refrigerant-to-water heat exchanger.

In the outdoor heat exchanger of such heat pump systems the water is circulated to the outdoor heat exchanger by a pump circulating system which in addition to the heat exchanger includes, a circulating pump, a cooling tower, a storage tank and/or a hot water tank. Such heat pump systems are well known and easily purchaseable on the open market.

There may be several indoor coils, one for each of several spaces to be conditioned and a single outdoor coil or there may be not only a plurality of indoor coils but also a plurality of outdoor coils, the piping being so connected as to promote efficiency between the systems to be connected.

Where there are more than one outdoor heat exchanger the circulating pump will supply the water to each of the refrigerants to water heat exchangers in parallel flow.

In the prior art systems, the water flow is delivered in a continuous cycle at a flow rate of about 2 to 3 gallons per minute per ton of cooling capacity.

At this constant rate of water flow, the water temperature must be controlled if efficient operation is to be maintained because when the inlet temperature of the water is about 65° F. and the heat pump is switched to a cooling mode the outdoor refrigerant to water heat exchanger will cause the refrigerant gas to liquify producing "slugging" in the compressor from which potential malfunction and damage will result. Additionally, the refrigerant coil in the outdoor refrigerant to water heat exchanger may become covered with frost and ice which will render it non-functional for the required heat exchange performance.

Conversely, in the heating mode if the water temperature is above 90° F. the refrigerant compressor will overload and malfunction will result.

The present invention seeks to overcome these problems of the prior art devices by providing a thermally actuated phase change operated conrol valve in the pump circulating system which will vary the volume of water flow delivered by the pump circulating system to the outdoor refrigerant to water heat exchanger, irrespective of the water inlet temperature, as a function of the refrigerant temperature entering the outdoor refrigerant to water heat exchanger so as to insure proper loading on the compressor.

Additionally the present invention provides an improved control valve in that the outlet ports which communicate with the outlet means for the control valve are in the form of substantially rectangular slots so that a large change in porting per given amount of valve head stroke is obtainable. This is important in systems where fluid flow is established by circulating pumps of the centrifugal type which delivers the fluid at a relatively low pressure head. Since, a limited amount of stroke is obtainable from a thermally actuated operator this type of porting means produces a large change in the volume of water flow for a small variation in temperature.

SUMMARY OF THE INVENTION

Thus, the present invention covers a thermally actuated phase change operated control valve having, a valve body means with walls therein defining a fluid flow chamber, said valve body means having an inlet in communication with said fluid flow chamber, an outlet, and port means disposed in spaced relation to each other and respectably in communication with said outlet means, valve head means slidably disposed in the valve body for movement to and fro in said fluid flow chamber relative the port means from a calibrated setting thereof, said valve head sized relative the spaced ports to provide a minimum flow through said port means at said calibrated setting. Phase change power means adjustably connected to said valve body means includes, a thermal sensor for sensing variations in temperature to actuate said phase change power means, and an operator movable to and fro as a direct function of said variations in temperature sensed by the thermal sensor, means connecting the operator to said valve head means to adjust said valve head means to the calibrated setting on movement of the phase change power means relative the valve body means and to move said valve head means to and fro in said fluid flow chamber to direct fluid to said port means in direct proportion to the variations in temperature sensed by the thermal sensor, and resilient means in said valve body means operative to maintain said valve head means in continuance communication with said operator of the phase change power means.

Additionally, the thermally actuated phase change operated control valve above described including means for calibrating the control valve by setting the position of the phase change power means thereon.

Additionally, the thermally actuated phase change operated control valve above described including substantially rectangularly shaped outlet ports sized to provide an area substantially equivalent to the cross-sectional flow area of the inlet flow passage and operatively associated with a valve head to provide a large volumetric water flow change for a small variation in temperature change.

Additionally, the combination with a heat pump system of the above described thermally actuated phase change operated control valve wherein the thermal sensor of the phase change power means is responsive to the refrigerant temperature entering or leaving the outdoor heat exchanger of said heat pump system so as to control the flow of water coolant to said outdoor heat exchanger as a function of the variations in refrigerant temperature of the heat pump system.

Accordingly, it is an object of the present invention to provide a thermally actuated phase change operated control valve.

It is another object of the present invention to provide a thermally actuated phase change operated control valve which will provide a predetermined minimum flow therethrough within a given range of temperature change.

It is another object of the present invention to provide a thermally actuated phase change operated control valve which can be calibrated to provide a predetermined minimum flow therethrough within a given range of temperature change.

It is another object of the present invention to provide a thermally actuated phase change operated control valve which responds directly to the refrigerant temperature of an associated heat pump system as the signal for increasing or decreasing water flow in the refrigerant to water outdoor heat exchanger of said heat pump system.

It is another object of the present invention to provide a thermally actuated phase change operated control valve having substantially rectangular outlet ports or slots disposed for operative association with valve head means so that relative small variations in temperature will permit the control valve to deliver large volumes of water flow.

It is another object of the present invention to provide a thermally actuated phase change operated control valve for use in a heat pump system to improve the efficiency of the outdoor refrigerant to water heat exchanger and to optimize loading on the compressor for said heat pump system.

It is another object of the present invention to provide a thermally actuated phase change operated control valve for use in a heat pump system which prevents slugging back of liquid refrigerant into the suction side of the compressor and thereby acts to protect the compressor from damage which would result therefrom.

Other objects and advantages will become apparant from the details of the construction and operation as hereinafter more fully described and claimed with reference to the accompanying drawings which illustrate one preferred embodiment and application of the invention, and in which:

Figure 1:
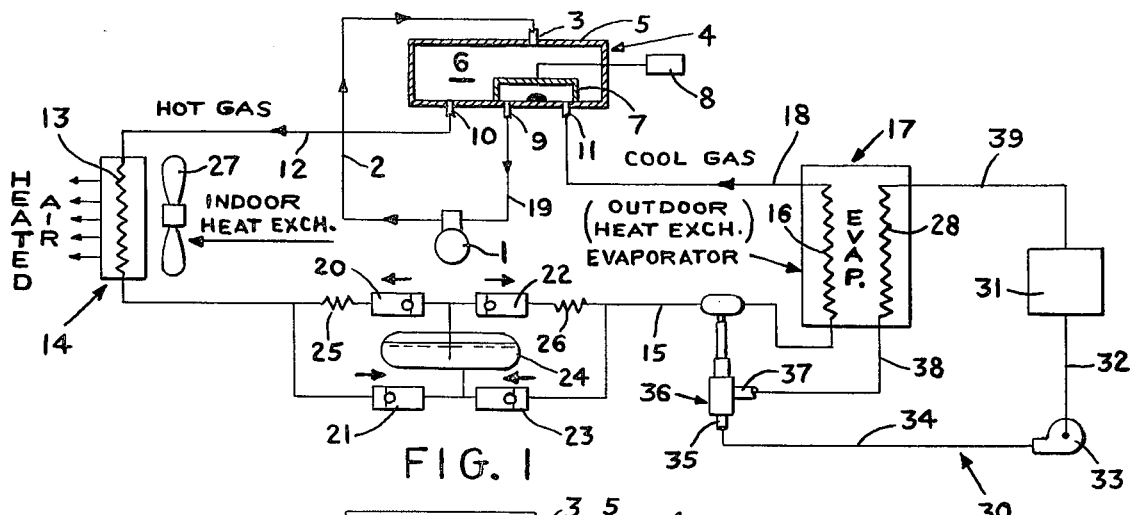
FIG. 1 is a schematic view of a heat pump system shown in the heating mode including a thermally actuated phase change operated control valve in accordance with the present invention for controlling the flow of the circulating water to the outdoor refrigerant-to-water heat exchanger in said heat pump system.
Figure 2:
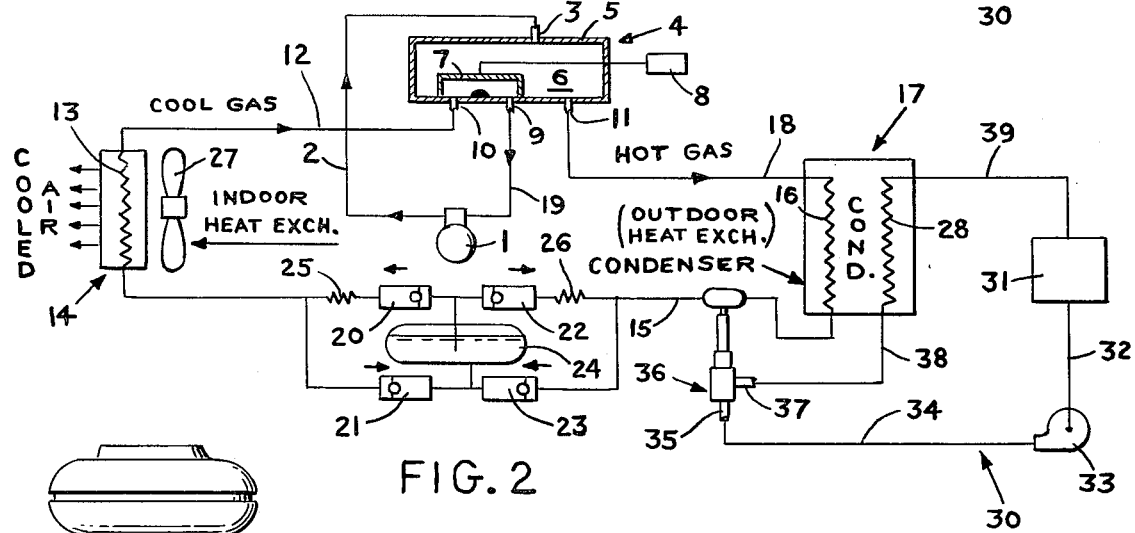
FIG. 2 is a schematic drawing of a heat pump system in the cooling mode including, a thermally actuated phase change operated control valve in accordance with the present invention for controlling the flow of cooling water to the outdoor heat exchanger in said heat pump system.
Figure 3:
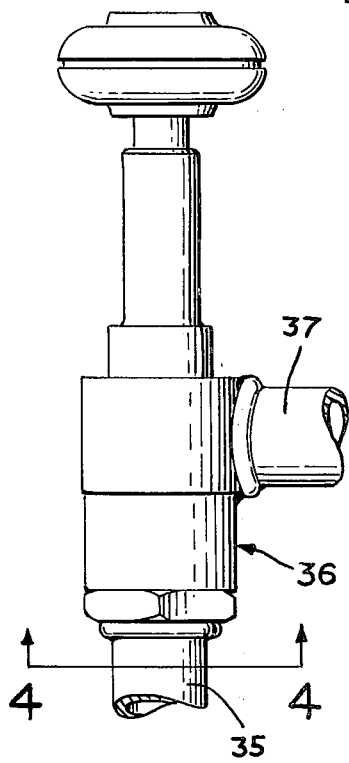
FIG. 3 is a side view of a thermally actuated phase change operated control valve in accordance with the present invention.
Figure 4:
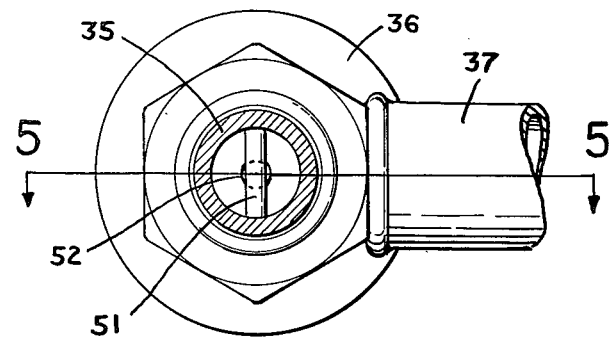
FIG. 4 is an inlet end view of the thermally actuated phase change operated control valve shown in FIG. 3.

Referring to the drawings in FIGS. 1 and 2 identical forms of a conventional heat pump system are illustrated. The heat pump system in FIG. 1 in the heating mode and the heat pump system in FIG. 2 in the cooling mode.

In describing the respective heat pump systems shown in FIGS. 1 and 2 like elements will receive the same character numerals.

Thus, in the heat pump system in FIG. 1, the refrigerant compressor 1 discharges compressed refrigerant gas through the main discharge line 2 which is connected to the inlet port 3 of a refrigerant valve 4. Any of the freon refrigerants suitable for the temperature and pressure conditions at which the heat pump system is intended to operate may be utilized in this system. Further, reversing valves for heat pump systems are well known and easily purchaseable on the open market.

Reversing valve 4 in FIGS. 1 and 2 includes, a valve body 5 defining a valve chamber 6, in which a centrally disposed slide valve 7 is positioned by a solenoid valve 8. The solenoid valve 8 can be actuated manually or automatically responsive to a temperature condition such as the ambient atmospheric temperature or the temperature of the spacer or spaces to be conditioned by the heat pump system as is well known and understood by those skilled in the art.

The reversing valve 4 is provided with a plurality of laterally disposed ports in the side wall thereof as at 9, 10 and 11 which are operatively associated with the slide valve 7.

FIGS. 1 and 2 further show that a first connecting line or conduit 12 is connected to the valve housing so that it communicates at one end with the port 10 and is connected at the opposite end to a first heat exchange coil 13 in an indoor refrigerant-to-air heat exchanger 14. The first coil 13 is in turn connected at the opposite end thereof to a transfer line 15 which connects and communicates at the opposite end thereof with a second heat exchange coil 16 in an outdoor refrigerant-to-water heat exchanger 17. The opposite end of the second heat exchange coil 16 is in turn connected to one end of a second connecting line or conduit 18 which connects at its opposite end to the valve housing 5 so that it communicates with the port 11.

A main return line or conduit 19 is also connected to the valve housing 5 so that one end communicates with the port 9 and at the opposite end with the suction inlet side of the refrigerant compressor 1.

Thus depending on the position of the slide valve 7 refrigerant gas delivered from the heat pump system to the port 10 or 11 as is more fully described hereinafter, will be passed through valve port 9 and line 19 to the suction inlet side of the refrigerant compressor 1.

The transfer line or conduit 15 is provided with unidirectional check valves as at 20, 21, 22 and 23, and accumulator 24 and expansion devices 25 and 26 to allow the refrigerant liquids to accumulate and expand into gas as they flow and pass through the heat pump system as is well understood by those skilled in the art.

The indoor refrigerant-to-air heat exchanger 14 will be provided with a fan 27 to pass ambient air from the space to be conditioned over the first heat exchange coil 13 therein so that non-contacting heat exchange occurs between the refrigerant gases passing through the coil 13 and the ambient air being passed over the coil. Such heat exchange devices are well known in the art, easily purchaseable on the open market and therefore not described more fully in the present application.

The outdoor refrigerant-to-water heat exchanger 17 has a third coil 28 through which water is circulated by a pumping system generally designated 30 which is connected to any suitable heat sink source of water such as a water tower, well water, lake water etc.

Thus, FIGS. 1 and 2 show that the pump circulating water system 30 includes, a conventional water tower 31 connected by line 32 to the suction inlet side of a circulating pump 33 in turn connected by line 34 to the inlet 35 of a thermally actuated phase change operated control valve 36 in accordance with the present invention. The control valve 36 has its outlet 37 connected to a line 38 which communicates with one end of the third heat exchange coil 28 in the refrigerant-to-water heat exchanger 17. The remote end of the heat exchange coil 28 is connected by line 39 to the cooling tower 31 so that fluid from the heat exchanger can be returned to the cooling tower for treatment and for recirculation through the pump circulating system 30.

In operation when the heat pump system is operating in either the heating or the cooling mode as shown in FIGS. 1 and 2 of the drawings the pump circulating system 30 will be in continuous operation and thus the pump 33 will draw water from the water tower 31 through the line 32 and discharge the same through line 34 to the control valve 36. The control valve 36 will regulate the quantity of water passed through line 38 to the third heat exchange coil 28 and returned therefrom through line 39 to the cooling tower 31. Outdoor refrigerant-to-water heat exchangers and their associated pump circulating systems for circulating water thereto except with respect to the thermally actuated phase change operated control valve 36, are well known in the art, easily purchaseable on the open market and hence not more fully described in the present application.

In the heating mode as shown in FIG. 1, the side valve 7 uncovers port 10 and connects port 11 to port 9. Thus during the heating cycle the refrigerant gas is so routed as to make the outdoor refrigerant-to-water heat exchanger 17 an evaporator. The system being designed so that in the heating mode the temperature of the refrigerant gas in the second heat exchange coil 16 is always below that of the water being circulated in the third heat exchange coil 28. The refrigerant therefore absorbs heat from the water and this heated refrigerant gas coupled with the heat of compression will be transferred by non-contacting heat exchange relation with the ambient air being passed over the first heat exchange coil 13 in the indoor refrigerant-to-air heat exchanger 14 by the fan 27.

In the cooling mode as shown in FIG. 2 the slide valve uncovers port 11 and connects port 10 to port 9. Thus, during the cooling cycle the refrigerant gas is so routed as to make the outdoor coil a condensor. The system is so designed that on cooling the condensing temperature of the refrigerant gas is always above that of the water circulated in the outdoor refrigerant-to-water heat exchanger 17. Thus in this outdoor refrigerant-to-water heat exchanger 17 the refrigerant gas passes heat into the circulating water and in the refrigerant-to-air indoor heat exchanger 14 will absorb heat from the ambient air being passed over the first heat exchange coil 13 by the fan 27.

During the heating mode or heating cycle of the heat pump as the ambient air temperature in the space to be conditioned decreases there is an increasing demand for more heat. This requirement can only be met by increasing the volume of water flow in the outdoor refrigerant-to-water heat exchanger so that there will be a higher rate of heat exchange, that is a flow of heat from the water to the refrigerant. Thus during the heating mode or heating cycle as the ambient air temperature in the space decreases, the requirement for more water flow in the outdoor refrigerant-to-water heat exchanger increases. Conversely in the heating mode or heating cycle as the ambient air temperature of the space to be conditioned increases, there will be a corresponding requirement for less heat which therefore means that there will be less flow required through the outdoor refrigerant-to-air heat exchanger for this cycle.

During the cooling mode or cooling cycle as the ambient air temperature in the space to be conditioned increases, there is a corresponding requirement for a higher rate of heat exchange so the refrigerant can transfer its heat to the water being circulated in the outdoor refrigerant-to-water heat exchanger 17. This is met by a requirement for increased water flow through the outdoor refrigerant-to-water heat exchanger 17. Thus, during the cooling cycle as the ambient air temperature in the space to be conditioned increases, the requirement for water flow in the outdoor refrigerant-to-air heat exchanger increases and conversely as the ambient air temperature in the space to be conditioned decreases, there will be a corresponding reduction in the water flow in the outdoor refrigerant-to-water heat exchanger.

The present invention seeks to provide a heat pump system which performs in the heating mode and cooling mode as above described by controlling the flow of water delivered by the pump circulating system 30 to the outdoor refrigerant-to-water heat exchanger 17 because such heat pump system would operate in the most efficient manner, optimize the loading on the refrigerant compressor for the system, and protect and prevent damage to the compressor due to slugging back of liquid refrigerant into the suction inlet side of the refrigerant compressor for the heat pump system.

This is accomplished in accordance with the present invention by means of the improved thermally actuated phase change operated control valve 36 which is inserted into the pump circulating system 30 and will now be described.

CONTROL VALVE

The thermally actuated phase change operated control valve 36 is designed to effect modulation of the flow of water delivered by the pump circulating system 30 to the outdoor refrigerant-to-water heat exchanger so as to meet the parameters above described and functions responsive to variations in temperature as the refrigerant being circulated in the heat pump system.

FIGS. 3 to 8 show that the control valve 36 has an elongated substantially cylindrical valve body 40 having a longitudinally extending bore therethrough which defines a fluid flow chamber 41. The fluid flow chamber 41 is closed at one end by a threaded member 42 which forms the inlet 35 for the fluid flow chamber and connects one end of line 34 from the pump circulating system 30 to the control valve 36.

Figures 5, 6, 7, 8:
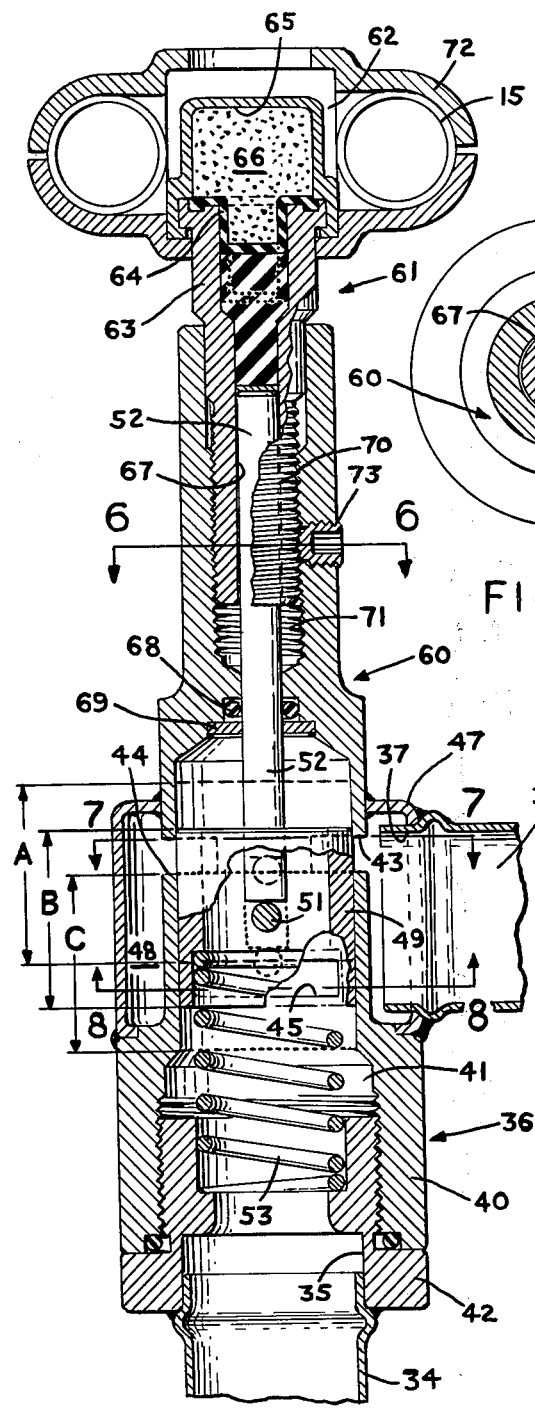
FIG. 5 is a vertical section taken on line 5—5 of FIG. 4.
FIG. 6 is a cross-section taken on line 6—6 of FIG. 5.
FIG. 7 is a cross-section taken on line 7—7 of FIG. 5.
FIG. 8 is a cross-section taken on line 8—8 of FIG. 5.

Medially the valve body 40 is further provided with a first pair of spaced and sized outlet ports 43 and 44 and a second pair of spaced and sized outlet ports 45 and 46 which are disposed at 90° to each other as is shown in FIGS. 5, 7 and 8 of the drawings.

FIGS. 5, 7 and 8 further show that an annular collar 47 about the medial portion of the valve body 40 defines an annular collecting chamber 48 and the annular collar 47 also forms the outlet 37 which communicates with connecting line or conduit 38 of the pump circulating system 30 for delivering water to the third heat exchange coil 28 of the outdoor refrigerant-to-water heat exchanger 17.

In order to control the flow of water or other liquids from the inlet 35 to the outlet ports 43, 44, 45 and 46 of the control valve 36, a valve head or spool 49 is slidably mounted in the bore which defines the fluid flow chamber 41. The valve head or spool 49 illustrated in the form of the invention shown at FIGS. 3 to 8 of the drawings is a cylindrical member which has a central passage 50 therethrough.

The outlet ports 43, 44, 45 and 46 are spaced a predetermined distance from each other and are rectangular in shape and size so that each respective first pair of outlet ports and second pair of outlets ports have an area at least equal to the cross-sectional area of the central passage 50 through the valve head 49.

Transversely of the central passage 50 in valve head 49 is a pin or shaft 51 which is disposed and aligned for engagement with the operating member 52 of an actuating assembly generally designated 60 and more fully described below. The operating member 52 acts on one side of the pin or shaft 51 and moves the valve head or spool in one direction or retracts away from the shaft or pin 51 so that a resilient member or spring 53 acting against the valve head or spool 49 on the side of the pin 51 opposite from the forces being exerted thereon by the operating member 52 will act to move the valve head 49 in a direction opposite from the direction of force exerted by the operating member 52.

Thus the valve head 49 can be moved in one direction by the operator 52 of the actuating means to uncover outlet port 43 and 44 and thus permit water or other fluid to pass through the central passage 50 to these ports or when the operating member 52 retracts the valve head or spool 49 can be moved in the opposite direction by the resilient member 53 to uncover the outlet ports 45 and 46 to pass water or other fluid from the inlet 35 through these outlet ports to the annular space 48 and outlet 37 to the connecting line 38.

FIGS. 5, 7 and 8 further show that the valve head or spool 49 will have a length greater than the total distance between the furthest edges of the outlets 43, 44, 45 and 46 respectively so that it can if properly calibrated initially cover these ports in the calibrated position as shown in FIG. 5 of the drawings. However, because it is desirable to maintain a predetermined minimum flow of water or other fluid through the outlet ports 43, 44, 45 and 46 the O.D. of the valve head or spool 49 will be made slightly less than the I.D. of the bore which defines the fluid flow passage 43 at the point where said outlets are located. This will be approximately 0.003" to 0.004" for a flow of water or other fluid of approximately ¼ to ½ G.P.M. Further the length of the valve head 49 will determine the length of the —dead band— or position of flow which corresponds to a given temperature range as hereinafter described at which such minimum flow will always continue.

The valve head or spool 49 when moved so as to uncover either the pair of outlet ports 43 and 44 or the pair of outlet ports 45 and 46 will be hydraulically balanced in each of the infinite number of positions that the valve head or spool 49 can move and thus it will not require any additional force to move the valve in any of these positions. This is important because the actuating means is a phase change operator which is thermally actuated as will now be described.

Thus the actuating assembly 60 has a thermally sensitive phase change power element generally designated 61. Phase change power element 61 as illustrated in FIGS. 5 to 8 of the drawings is of the squeeze push type because it provides the relatively long stroke necessary to operate the valve head 49.

Phase change power element 61 includes a main cup shaped housing 62 and an elongated guide section 63. A plug diaphragm 64 is held in fluid tight sealing engagement between the cup shaped housing 62 and the guide section 63 when they are in the assembled position as shown in FIG. 5 of the drawings. One side of the diaphragm 64 defines with the cup shaped housing 62, the chamber 65 for holding a suitable expansion material generally designated 66. Operatively connected to the plug diaphragm on the side opposite from the chamber 65 is the piston operator 52 which is slidably mounted in a guide bore 67 formed in the guide section 63. Piston operator 52 extends beyond the end of the guide section 63 so that in assembled position as also shown in FIG. 5, the end of the piston operator 52 will be in operative engagement with the wrist pin 51 on the valve head 59. The movement of the piston 52 being counterbalanced and maintained in constant positive movement in either direction by the spring 53 as above described.

FIG. 5 shows that a seal 68 and seal retainer 69 is provided for the bore 67.

About the exterior of one end of the guide section 63 a threaded section 70 is provided to connect the phase change power element 61 into the threaded bore 71 in the end of the valve body 40 remote from the inlet 35.

At the opposite end the phase change power element 61 will be connected into intimate contact with the refrigerant line 15 as by curling the line about the cup shaped housing 62 by means of a suitable clamp 72. The phase change power element 61 can be adjusted to the desired setting or calibration for the valve head 49 for reasons more fully described hereinafter by rotating the valve body 40 or the phase change power element 61 in either a clockwise or counter-clockwise direction so as to move or thread the guide section 63 to and fro across the threaded section 71 in the valve body 40. After the valve head 49 is set or calibrated it can be locked in position by adjusting the set screw 73 provided in the valve body 40 at a point adjacent the point where the guide section 63 extends into the threaded section 71. When it is desired to reset or recalibrate the phase change power element 61, the set screw 73 will be loosened and after the phase change power element is reset or recalibrated the set screw 73 can be retightened to hold the power element in the set or calibrated position.

Phase change power elements of the type herein described are available on the open market and are devices which can translate temperature variations into mechanical force. This is accomplished by a thermal expansion material which achieves a full degree of expansion over a small change in temperature. The thermal expansion materials which meet this criteria can be selected for the particular conditions of operation or the control range necessary for the associated system. The operation of the thermally actuated phase change operator control valve 36 illustrated in the present invention is best understood as applied to the heat pump system above described particularly with reference to the graph shown at FIG. 9 of the drawings which shows water flow with respect to change in refrigerant temperature. The change in refrigerant temperature is directly related to the change in the temperature of the ambient air of the space being conditioned and the relationship between refrigerant flow and water flow will now be described with reference to the operation of the heat pump system shown in FIGS. 1 and 2 of the drawings utilizing a valve 36 in accordance with the present invention.

OPERATION

In the heating mode as shown in FIG. 1 of the drawings the refrigerant is routed by the reversing valve 4 so as to make the outdoor heat exchanger 17 an evaporator all as above described. The heat pump system will be so designed that in the heating mode the temperature of the refrigerant passing to the outdoor heat exchanger 17 will always be below that of the water being circulated therein. The refrigerant therefore will absorb heat from the water and this heat in turn will be rejected or transferred to the ambient air from the space being conditioned which passes over the indoor heat exchanger 13 which acts as a condensor in the heating mode of the heat pump system.

In the heating mode as the ambient air temperature decreases which indicates a requirement for more heat in the space to be conditioned there is an increasing requirement for more water flow in the outdoor heat exchanger 17 so that a higher rate of heat exchange will occur between the refrigerant and the water as the refrigerant flows through the outdoor heat exchanger 17.

Conversely as the temperature of the ambient air in the space to be conditioned increases, there will be a decrease in the amount of heat required and this will produce a decrease in the flow of water through the outdoor heat exchanger 17 thereby reducing the rate of heat exchange which occurs between the refrigerant and the water flowing through the outdoor heat exchanger 17.

The thermally sensitive phase change power element 61 of the control valve 36 responds to the temperature of the refrigerant entering the outdoor heat exchanger 17 and the thermally sensitive material 66 will be selected so that in the heating mode the valve 49 will be fully opened at 45° F. or the position A of piston pin 51 as shown in FIG. 5 of the drawings. As the temperature of the ambient air increases in the space being conditioned there will be a gradual reduction in water flow through the valve 36 until the temperature of the refrigerant reaches 60° at which point a minimum or by-pass water flow of approximately one gallon per minute will result. In the present illustrated form of control valve 36, this will be the position shown at B where merely the clearance between the outer diameter of the valve head 49 and the valve chamber or bore 41 will permit this minimum or by-pass flow to occur.

In the cooling mode as shown in FIG. 2 of the drawings, the refrigerant is routed by the reversing valve 4 so as to make the outdoor heat exchanger 17 a condenser all as above described. The heat pump system is so designed that in the cooling mode the condensing temperature is always above that of the water circulated in the outdoor heat exchanger 17. Thus, the heat absorbed by the refrigerant from the ambient air as it passes through the indoor heat exchanger 13 which is now acting as an evaporator will be transferred from the refrigerant to the water as it passes through the outdoor heat exchanger 17.

In the cooling mode as the temperature of the ambient air in the space being conditioned decreases there is a lesser requirement for transferring heat from the refrigerant being circulated through the outdoor heat exchanger 17. This reduces the condensing requirement and hence the rate of water flow in the outdoor heat exchange coil 17. Conversely as the temperature of the ambient air in the space being conditioned increases, the rate of water flow through the outdoor heat exchanger 17 will also increase.

In the cooling mode control valve 36 will be fully opened when the temperature of the refrigerant entering the outdoor heat exchanger 17 is at 95° F. which will be the position designated C for the piston pin 51. The water flow will be gradually decreased as the temperature of the refrigerant decreases down to approximately 80° F. at which point the valve head 49 will be again at the minimum flow or by-pass flow position B of approximately one gallon per minute.

Figure 9:
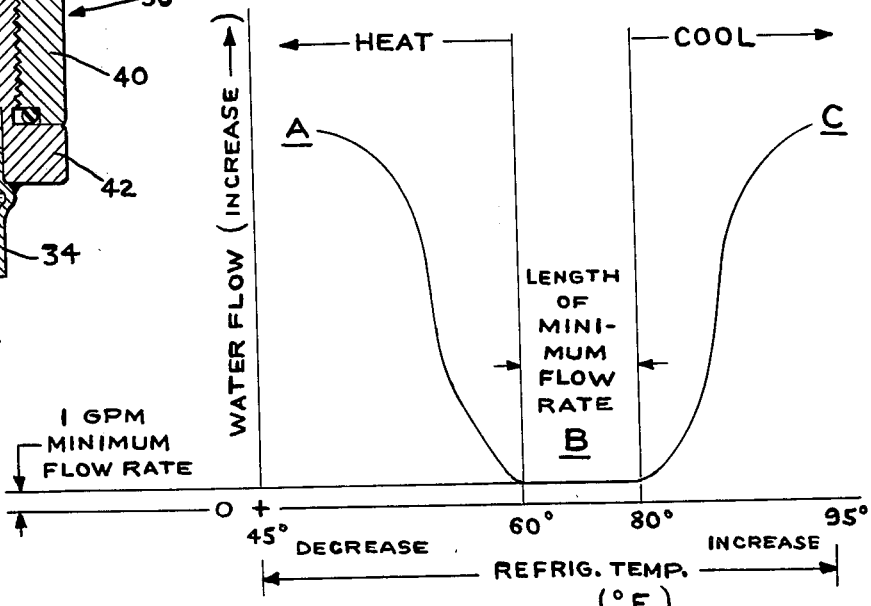
FIG. 9 is a graph showing water flow through the thermally actuated phase change operated control valve shown in FIGS. 3 to 8 as a function of the change in refrigerant temperature in the heat pump system of the type shown in FIGS. 1 and 2.

From the graph at FIG. 9 of the drawings, it will be clear that when the refrigerant temperature is between 60° F. and 80° F. there will be a 20° F. temperature variation at which the minimum flow rate of about one G.P.M. will prevail.

The control valve 36 will be set or calibrated to this minimum flow position by rotating the valve body 40 relative the actuating assembly 61 until the piston operator 52 is adjusted into engagement with piston pin 51 at the ambient temperature. If properly calibrated the valve head 49 will lie in the minimum flow rate position when refrigerant temperature is between 60° F. and 80° F. and if desired the minimum flow rate position can be varied or changed as a function of the length of the valve head 49.

A heat pump system with water flow being controlled in the outdoor heat exchanger as above described will operate in the most efficient manner, and loading on the compressor will be optimized. Protection for the compressor will result because the slugging back of liquid refrigerant into the suction side of the compressor and the damage that may result therefrom will be eliminated.

In the illustrated embodiment of the control valve shown in FIGS. 3 to 8 of the drawing, the minimum or by-pass leakage is obtained by an intentional clearance between the valve head 49 and the bore 41 of the valve body 40.

ANOTHER FORM OF THE CONTROL VALVE

Figure 10:
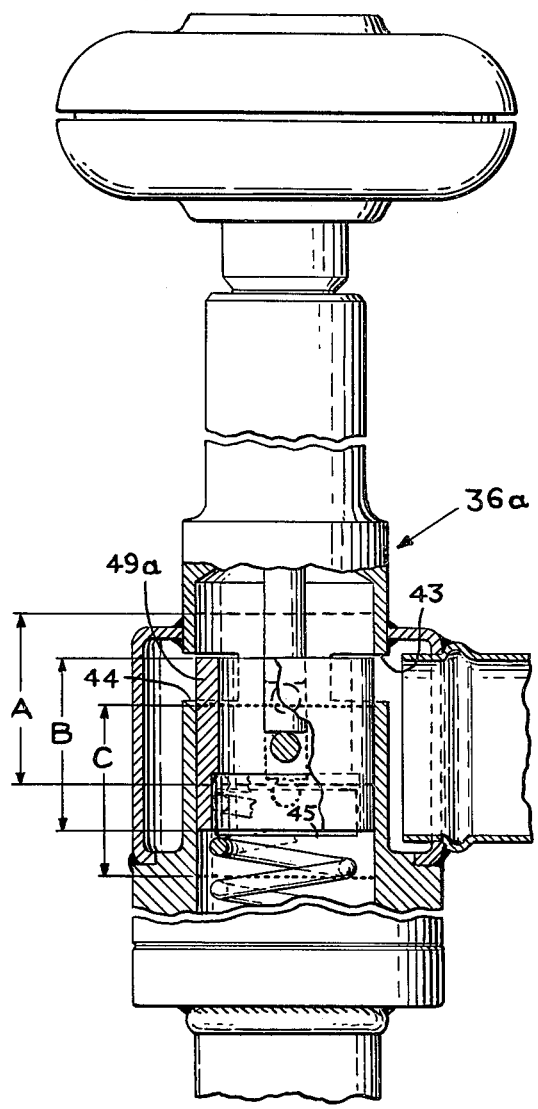
FIG. 10 is a side view partly in vertical section of another form of thermally actuated phase change operated control valve.

FIG. 10 illustrates another form of control valve generally designated 36a which functions in the same manner as the thermally actuated phase change operated control valve 36 shown in FIGS. 3 to 8 of the drawings and above described.

In control valve 36a as shown in FIG. 10 all the elements and parts are identical with those of the control valve 36 except for the valve head which is designated 49a to distinguish it from the valve head 49 of the first above described form of the invention.

The difference as also shown in FIG. 10 is that the valve head 49a is shorter in length than the respective remote lying side edges of the ports 43, 44, 45 and 46. Only ports 43, 44 and 45 are shown in FIG. 10 but port 46 is also shown in FIGS. 7 and 8 of the drawings and lies identically in the valve body 40 of the control valve shown in FIG. 10 of the drawing.

Figure 11:
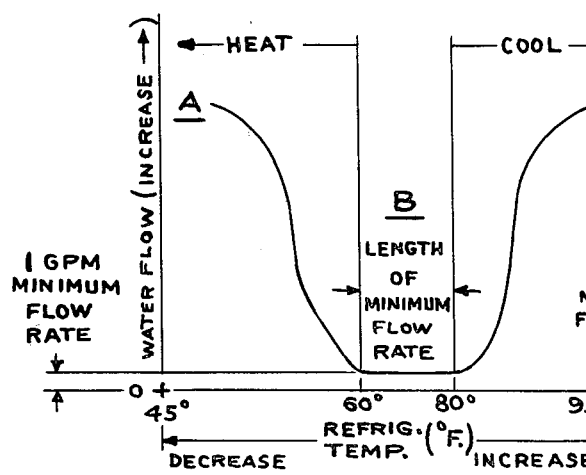
FIG. 11 is a graph showing that the water flow as a function of refrigerant temperature in a heat pump system of the type shown in FIGS. 1 and 2 for the thermally actuated phase change operated control valve shown in FIG. 10 is identical with that of the control valve shown in FIGS. 3 to 8 of the drawings.

The valve head 49a will be calibrated in the same manner as above described for the control valve 36 and in the position designated B shown by the full lines in FIG. 10, the small arcuate area of the ports 43, 44, 45 and 46 will be uncovered and thus permit by-passing of approximately 1 G.P.M. at the minimum flow rate between 60° F. and 80° F. as is illustrated in the graph at FIG. 11 of the drawing.

The graph at FIG. 11 shows that the water flow through the thermally actuated phase change operated control valve 36a shown in FIG. 10 as a function of the changes in refrigerant temperature of an associated heat pump system of the type shown in FIGS. 1 and 2 of the drawings is identical with that of the form of control valve 36 shown in FIGS. 3 to 8 of the drawings.

AN ALTERNATE FORM OF THE CONTROL VALVE

Figure 12:
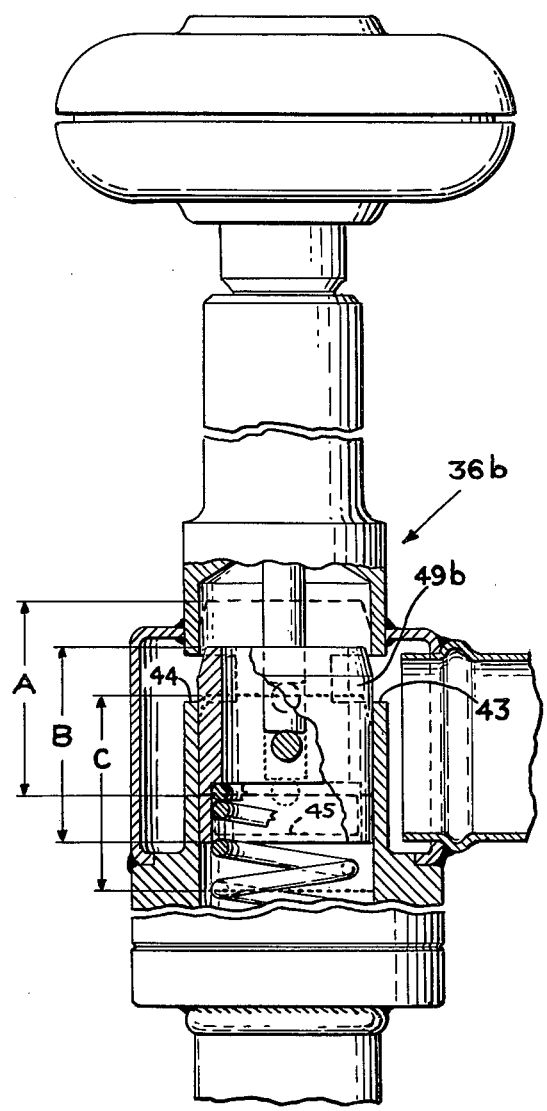
FIG. 12 is a side view partly in vertical section of still another form of thermally actuated phase change operated control valve designed to vary the water flow as a function of the variations in refrigerant temperature of a heat pump system of the type shown in FIGS. 1 and 2 of the drawings.

It may be desirable to vary the water flow through the control valve in accordance with the present invention and at FIG. 12 an alternate form of such control valve designated 36b is illustrated for this purpose.

Thus by reference to FIG. 12 it will be seen that the thermally actuated phase change operated control valve 36b will have elements and parts which are identical with those above described for the form of control valve shown in FIGS. 3 to 8 of the drawings except for the valve head designated 49b to distinguish it from the valve head 49 of the form of the invention shown at FIGS. 3 to 8 and from the valve head 49a of the form of the invention shown in FIG. 10.

The difference in the valve head of the thermally actuated phase change operated control valve shown in FIG. 12 is that the valve head 49b is beveled about the periphery of one end of the valve.

Figure 13:
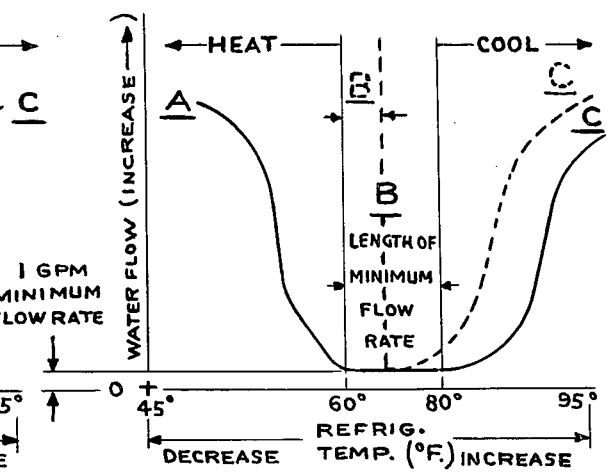
FIG. 13 is a graph showing the water flow through the thermally actuated phase change operated control valve shown in FIG. 12 as a function of the change in refrigerant temperature in the heat pump system of the type shown in FIGS. 1 and 2 of the drawings.

The valve head 49b as illustrated is longer than the outer extremities of the side edges of the spaced outlet ports 43, 44, 45 and 46 and clearance between the O.D. of the valve head and the I.D. of the bore will provide the same minimum flow as is obtained in the form of the invention as shown in FIG. 5. However, because of the beveled end of the valve head the ports will open more rapidly on a rise in refrigerant temperature. Thus as is indicated by the solid line in the graph at FIG. 13 the slope on the cooling curve to position C as shown in FIG. 12 will be less steep than the heating curve.

If however the valve head 49b is shorter than the outer extremity of the side edges of the spaced outlet ports 43, 44, 45 and 46 then the dead band area or minimum flow rate span will be shorter. The flow rate for the cooling curve to position C as shown by the dotted line in FIG. 12 will be less than the heating curve.

Thus in order to recover or increase the length of the dead band or minimum flow rate it is necessary to use a longer valve head as is illustrated at FIG. 12 of the drawings.

While in this alternate form of the present invention, the valve head 49b is illustrated as beveled about the periphery of one end thereof, this is merely by way of illustration and those skilled in the art will readily understand that alternate variations for changing either one or both of the ends of the valve head 49b could be utilized depending upon the variations in flow desired without departing from the scope of the present invention.

Accordingly, there has been above described several forms of thermally actuated phase change operated control valves which are particularly adapted for use in connection with a heat pump system of the type shown in FIGS. 1 and 2 of the drawings wherein a refrigerant to water outdoor heat exchanger is utilized in the system.

It will be understood that the invention is not to be limited to the specific construction or arrangement of parts shown but that they may be widely modified within the invention defined by the claims.

What is claimed is:

1. A thermally actuated phase change operated valve for controlling flow of fluid comprising,
   a. valve body means having walls therein defining a fluid flow chamber,
   b. said valve body means having, an inlet for passing fluid to said fluid flow chamber, an outlet means, and a pair of spaced port means in the walls of said valve body means connecting the fluid flow chamber to said outlet means,
   c. valve head means in the fluid flow chamber of said valve body means slidable therein for movement from an initial calibrated setting to and fro across the spaced port means in the walls defining said fluid flow chamber to modulate the flow of fluid through said pair of spaced port means depending on the direction of movement of said valve head means,
   d. phase change power means adjustably connected to one end of said valve body means exterior of said fluid flow passage including, a connecting means extending through said wall means into said fluid flow chamber and connected to said valve head means whereby on movement of said phase change power means relative the valve body means the connecting means will position the valve head means at the desired initial calibrated setting,
   e. said phase change power means to actuate said connecting means responsive to temperature variations external to said valve so as to move the valve head means to and fro proportional to said variations in temperature and thereby vary the flow of fluid through the respective spaced port means, and
   f. said valve head means sized relative the walls defining the fluid flow chamber and the pair of spaced port means respectively to permit a predetermined minimum flow of fluid to pass from said fluid flow chamber through the spaced port means to said outlet means within a limited dead band range of temperature variations which includes the temperature for the initial calibrated setting of the valve head means.

2. In a thermally actuated phase change operated control valve as claimed in claim 1 including, means for releasably locking the phase change power means at the adjusted calibrated setting for the valve head means.

3. In a thermally actuated phase change operated control valve as claimed in claim 1 wherein, said phase change power means includes;
   a. a thermal sensor at the outer end for sensing variations in a given temperature condition,
   b. container means holding a phase change material adapted to expand and contract between predetermined temperature variations signalled by said thermal sensor,
   c. means connecting said container means to said valve head means to convert the phase changes of said phase change material into linear movement of said valve head proportional to the variations in temperature sensed by said thermal sensor.

4. In a thermally actuated phase change operated control valve as claimed in claim 3 including, resilient means on the side of said valve head means opposite from the means for operating said valve head means for maintaining said valve head in engagement with said last mentioned means at all times.

5. In a thermally actuated phase change operated control valve as claimed in claim 1 wherein;
   a. the valve head means has flow passage means extending therethrough,
   b. the spaced port means have a substantially rectangular shape, and
   c. the spaced port means have an area approximately equal to the cross-sectional area of the flow passage means in the valve head means.

6. In a thermally actuated phase change operated control valve as claimed in claim 1 wherein;
   a. said valve head means has a length greater than the distance between the remote side edges of the spaced port means, and
   b. said valve head means has an outer diameter slightly less than the inner diameter of the walls forming the fluid flow chamber in the valve body means to permit a predetermined minimum flow of fluid to by-pass from the fluid flow chamber to the outlet means whenever the spaced port means are closed by said valve head means.

7. In a thermally actuated phase change operated valve as claimed in claim 6 wherein, the outer diameter of the valve head means is in a range from 0.003" to 0.004" less than the diameter of the wall defining the fluid flow chamber in the valve body means.

8. In a thermally actuated phase change operated control valve as claimed in claim 1 wherein;
   a. said valve head means has a length less than the distance between the remote side edges of the spaced port means, and
   b. said valve head means in the calibrated position provides a limited opening at each of the respective spaced ports for by-passing a predetermined minimum flow of fluid from the fluid flow chamber to the outlet means when the valve head means is in the calibrated setting.

9. In a thermally actuated phase change operated control valve as claimed in claim 1 wherein;
   a. said valve head has a length greater than the distance between the remote side edges of the spaced port means,
   b. said valve head means has an outer diameter slightly less than the inner diameter of the walls forming the fluid flow chamber in the valve body means to permit a predetermined minimum flow of fluid to by-pass from the fluid flow chamber to the outlet means whenever the spaced port means are maintained closed by the valve head means, and
   c. said valve head means having means forming a predetermined contoured surface on at least one outer peripheral end of the valve head means for controlling the rate and amount the associated one of said spaced port means will be opened or closed on movement of said valve head means relative said spaced port means.

10. In a thermally actuated phase change operated control valve as claimed in claim 1 wherein;
    a. said valve head has a length less than the distance between the remote side edges of the spaced port means,
    b. said valve head means has an outer diameter slightly less than the inner diameter of the walls forming the fluid flow chamber in the valve body means to permit a predetermined minimum flow of fluid to by-pass from the fluid flow chamber to the outlet means whenever the spaced port means are maintained closed by the valve head means, and
    c. said valve head means having means forming a predetermined contoured surface on at least one outer peripheral end of the valve head means for controlling the rate and amount the associated one of said spaced port means will be opened or closed on movement of said valve head means relative said spaced port means.

* * * * *